United States Patent
Ramalingesh et al.

(10) Patent No.: US 12,043,097 B2
(45) Date of Patent: Jul. 23, 2024

(54) DRIVE DEVICE FOR A ROOF COMPONENT OF A VEHICLE

(71) Applicant: Webasto SE, Stockdorf (DE)

(72) Inventors: Sunilkumar Ramalingesh, Stockdorf (DE); Jayaraj Rajesh Gurupatham, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 197 days.

(21) Appl. No.: 17/296,577

(22) PCT Filed: Feb. 25, 2020

(86) PCT No.: PCT/EP2020/054840
§ 371 (c)(1),
(2) Date: May 25, 2021

(87) PCT Pub. No.: WO2020/173905
PCT Pub. Date: Sep. 3, 2020

(65) Prior Publication Data
US 2021/0379971 A1    Dec. 9, 2021

(30) Foreign Application Priority Data
Feb. 25, 2019    (DE) .................... 10 2019 104 650.5

(51) Int. Cl.
*B60J 7/05* (2006.01)
*B60J 7/057* (2006.01)
*E05F 15/662* (2015.01)

(52) U.S. Cl.
CPC ........... *B60J 7/0573* (2013.01); *E05F 15/662* (2015.01); *E05Y 2900/542* (2013.01)

(58) Field of Classification Search
CPC ..... B60J 7/00; B60J 7/02; B60J 7/0007; B60J 7/043; B60J 7/057; B60J 7/0573;
(Continued)

(56) References Cited

U.S. PATENT DOCUMENTS 3,469,128 A * 9/1969 Gaston ................. H02K 7/1166
310/66
4,560,894 A    12/1985 Stoll
(Continued)

FOREIGN PATENT DOCUMENTS

DE    27 25 723 A1    12/1978
DE    33 25 801 A1    1/1985
(Continued)

OTHER PUBLICATIONS

Hessdorfer, "Electromotive Drive", Published: Sep. 7, 2006, Publisher: German Patent Office, Edition: DE102005008794A1 (Year: 2006).*
(Continued)

*Primary Examiner* — Joseph D. Pape
(74) *Attorney, Agent, or Firm* — Fitch, Even, Tabin & Flannery, LLP

(57) ABSTRACT

A drive device for a roof component of a vehicle, such as, for instance, a sliding roof and a solar protection roller blind, may have an electric motor which for activating the roof component interacts with a gearbox. The electric motor here is an external rotor electric motor of a flat construction mode which is aligned so as to be parallel to the installation height of the drive device in a vehicle roof and which has a wheel-shaped external rotor which by way of a toothing provided on the external circumference of the latter engages with the gearbox.

11 Claims, 4 Drawing Sheets

(58) Field of Classification Search
CPC ....... E05F 15/60; E05F 15/632; E05F 15/655; E05F 15/662; E05Y 2900/542; F16H 57/00; F16H 57/02; F16H 1/00; F16H 1/16; H02K 9/00; H02K 9/02; H02K 9/06
USPC .......................... 296/223; 310/63; 417/423.7
See application file for complete search history.

(56) References Cited

U.S. PATENT DOCUMENTS

| | | | |
|---|---|---|---|
| 6,629,905 B1 * | 10/2003 | Sesselmann | E05F 15/697 49/352 |
| 2003/0222520 A1 | 12/2003 | Yokota | |
| 2004/0100155 A1 * | 5/2004 | Sesselmann | E05F 15/697 310/67 R |
| 2005/0116554 A1 * | 6/2005 | Dano | F04D 25/064 310/58 |
| 2006/0035742 A1 | 2/2006 | Peter et al. | |
| 2006/0250034 A1 | 11/2006 | Umezu | |
| 2007/0163179 A1 * | 7/2007 | Fukumura | H02K 7/116 49/352 |

FOREIGN PATENT DOCUMENTS

| | | | | |
|---|---|---|---|---|
| DE | 198 32 208 C1 | 11/1999 | | |
| DE | 199 06 727 C1 | 6/2000 | | |
| DE | 10 2004 039 057 B3 | 9/2005 | | |
| DE | 102005008794 A1 * | 9/2006 | ......... | F04D 25/0606 |
| DE | 10 2005 036 108 A1 | 2/2007 | | |
| DE | 10 2011 113 429 A1 | 3/2013 | | |
| EP | 1553683 A1 | 7/2005 | | |
| JP | S5612479 U | 2/1981 | | |
| JP | S56108355 U | 8/1981 | | |
| JP | H1127900 A | 1/1999 | | |
| JP | 2001124058 A | 5/2001 | | |
| JP | 2004312873 A | 11/2004 | | |

OTHER PUBLICATIONS

International Search Report for PCT/EP2020/054840 mailed May 29, 2020 in English and German (6 pages).

* cited by examiner

DRIVE DEVICE FOR A ROOF COMPONENT OF A VEHICLE

CROSS-REFERENCE TO RELATED APPLICATIONS

This application is a U.S. national phase application filed under 35 U.S.C. § 371 of International Application No. PCT/EP2020/054840, filed 25 Feb. 2020, designating the U.S., which claims priority from German Patent Application No. 10 2019 104 650.5, filed 25 Feb. 2019, which are hereby incorporated herein by reference in their entirety for all purposes.

FIELD

The invention relates to a drive device for a roof component of a vehicle, such as, for instance, a sliding roof and a solar protection roller blind, having an electric motor, which interacts with a gearbox for operating the roof component.

BACKGROUND

FIG. 6 shows a known electric motor which, together with a worm drive, is used in the drive device mentioned at the outset for a vehicle sliding roof. The installation height z of the electric motor in a vehicle roof is derived from the right part of FIG. 6, said installation height z determining the installation height of the sliding roof drive device and, by virtue of the driving axle of said drive device that is aligned so as to be transverse to the vehicle height, corresponding to the external diameter of said drive device. Said installation height z is typically 33.8 mm. An embodiment of an electric motor of this type having an installation height z of 30.00 mm is also known.

The installation height of the electric motor, the latter determining the installation height of the sliding roof drive device, is critical above all in vehicles which have an electric drive and envisage a battery being installed in the floor pan region of the vehicle in order for this drive to be supplied. In this case, every millimeter of installation space of the electric motor of the sliding roof drive device is relevant, because the installation height of the vehicle body is fixed. The headroom for passengers is also affected as a result. A reduction in terms of the external diameter of the conventional electric motor shown in FIG. 6 for gaining free space for the benefit of passengers and the freedom of choice in terms of the battery for driving the electric vehicle cannot be considered because this reduction is associated with a reduction of torque (torque=force×radius) of the electric motor of the sliding roof drive device.

Electric motors of a flat construction mode are also known. For example, so-called DC disk rotor motors, based on NdFeB magnets, for high rotating speeds (5000 1/m), and extremely flat pancake motors, based on ferrite or NdFeB magnet materials, with a power of 0.13 . . . 0.70 Nm (32 . . . 220 W) are available from Printed Motors GmbH (www.printedmotors.com), for example. The latter motors mentioned are an alternative to high-performance drives which are predominantly used in the defense sector or in measuring technology. They are constructed from a stamped housing (steel sheet), a ball bearing which is unilaterally integrated in the A-flange, and from a rotor disk which is stamped from copper sheet and has up to 162 segments, depending on the disk diameter. The disk also simultaneously serves as a collector so as to achieve uniform commutation. These motors, which are available with a power of 40 and 530 W, are said to be distinguished by a large rotating speed adjustment range, precise true running even at crawling speeds, and little wear. However, in order to achieve sufficient power in conjunction with a relatively minor installation height, said known motors have a relatively large diameter which renders them unsuitable for driving the vehicle sliding roofs in the conventional way, having a driving axle running transversely to the vehicle height.

SUMMARY

It is an object of the invention to achieve a drive device for a roof element of a vehicle, for example a vehicle sliding roof, having a significantly reduced installation height without compromising the torque of the electric motor of said drive device.

This object is achieved by the features of claim 1. Advantageous refinements of the invention are set forth in the dependent claims.

The drive device of the invention for a roof component of a vehicle, such as, for instance, a sliding roof and a solar protection roller blind, has an electric motor which interacts with a gearbox for operating the roof component, wherein the electric motor is an external rotor electric motor of a flat construction mode which is aligned so as to be parallel to the installation height of the drive device in a vehicle roof and which has a wheel-shaped external rotor which engages with the gearbox by way of a toothing provided on its external circumference.

As a result, a particularly flat construction mode is advantageously achieved, in particular for installing the drive device in a vehicle roof.

In one configuration of the drive device according to the invention, the gearbox comprises two threaded spindles which are configured for meshing with the toothing of the electric motor and for driving at least one helix cable, wherein the helix cable is fixed to the roof component.

A particularly simple and robust drive of the gearbox, or operation of the roof component, respectively, is advantageously achieved as a result.

In one further configuration, the toothing provided on the external circumference of the external rotor is configured as a worm thread. In particular, the worm thread meshes with two threaded spindles of the gearbox, said threaded spindles driving the helix cable.

Thus, the movement of the motor can advantageously be transmitted to the gearbox in a particularly simple manner as a result.

According to an embodiment, the invention provides a drive device for the roof components of a vehicle, such as, for instance, a sliding roof and a solar protection roller blind, having an electric motor which by way of a gearbox drives a helix cable, which is fixed to the roof components for operating them. According to the invention, it is provided that the electric motor is an external rotor electric motor of a flat construction mode which is aligned so as to be parallel to the installation height of the drive device in a vehicle roof, its wheel-shaped external rotor by way of a worm thread provided on its external circumference engaging with two threaded spindles, which drive the helix cable.

The invention therefore advantageously utilizes the flat construction mode of an external rotor electric motor for its use in a drive device for a roof component of a vehicle, for instance a vehicle sliding roof or a solar protection roller blind, in that this motor is inserted with its rotation axis running parallel to the vehicle height and the external rotor being used for driving the sliding roof by way of the helix cable connected to the latter. In comparison to the prior art, this results in a significantly flatter or more compact construction mode for the drive device in the direction of the vehicle height. In this way, an installation height z of the electric motor and thus of the entire drive device of, for example, 16 mm can be achieved, which is significantly flatter in comparison to the 33.8 mm or 30.00 mm in the case of drive devices known from the prior art.

In particular, the electric motor comprises a stator and a rotor. Stator here usually refers to the stationary part of a motor which comprises elements for generating alternating magnetic fields which interact with in particular permanently magnetic elements of the movably mounted, in particular rotatable, rotor such that the rotor is set in motion, or kept in motion, by the alternating magnetic field.

In one configuration, the external rotor, which forms the rotor of the electric motor, is advantageously formed as a worm wheel which in particular drives, at two diametrically opposite sides, two threaded spindles, or lead spindles, which are connected to the helix cable. The worm wheel, in particular conjointly with the lead spindles, fulfils the function of a gearbox which in this shape has an ideally low installation height and can be produced in a cost-effective manner.

In particular, the external rotor which is formed as a worm wheel has a flat support element which is, for example, disposed so as to be perpendicular to the rotation axis of the rotor and a further element, which is encircling in the manner of a band and on which a worm thread is configured. The gear wheel is, for example, configured so as to be pot-shaped and disposed above the stator of the electric motor, thus enclosing it substantially in a radial direction and an axial direction.

The lead or threaded spindles for driving the helix cable can be disposed so as to be diametrically opposite to one another, or in another way, such that said helix cables can be driven by the motor.

The external rotor electric motor may comprise, for example, a stator having motor windings without a ferromagnetic intermediate element disposed between the windings. Accordingly, the stator of the external rotor electric motor is in particular advantageously composed of the motor winding of the electric motor, or the motor windings of the stator of the electric motor, respectively. This permits a particularly compact construction mode.

The upper side of the rotor is preferably provided with radially extending cooling vanes (42, 42i shown in in FIGS. 2 and 3 respectively) which are in particular set to be transverse so as to guarantee rapid and effective dissipation of heat. The cooling vanes advantageously extend such that they are inclined by approximately 2 mm. In the case of a solar protection roller blind for example, this vane construction contributes to increasing the air flow in the closing direction of the solar protection roller blind, when the motor has to run against a restoring force, for instance by a spring, by way of which the roof component, for instance the roller blind, is held back.

For example, the cooling vanes are inclined and/or aerodynamically shaped such that air flows through the rotor in a direction towards a stator of the motor when the rotor rotates in a first direction. Furthermore, the cooling vanes can be aerodynamically shaped such that air flows through the rotor in a direction away from the stator of the motor when the rotor rotates in a second direction. The cooling vanes can furthermore be configured such that an air flow toward the stator of the motor is generated when the rotor rotates in the direction in which the motor is operated at a higher power.

The preferably utilized transmission ratio of the drive device according to the invention of, for example, 13:22 maximizes the transmitted torque, and the force, respectively, which is required for achieving a preferably targeted speed (approximately 80 mm/s) for moving the roof component, such as, for instance, a sliding roof.

The construction of the electric motor according to the invention for the drive device in practice permits the implementation of an installation height (z) of 15 mm to 25 mm, preferably 16 mm to 18 mm, said construction height (z) thus being significantly smaller than in the prior art.

The external rotor of the external rotor electric motor can be formed from metal, for instance. The worm wheel can be configured by machining the external rotor, wherein the external rotor in this instance can be configured so as to be integral with the worm wheel. Furthermore, the worm wheel and the external rotor in the case of a construction having at least two pieces can be configured as at least two separate workpieces and be connected to one another in a rotationally fixed manner, for instance by adhesive bonding or welding.

The external rotor wheel of the motor, which is in particular configured as a worm wheel, advantageously replaces the motor housing of the external rotor electric motor, this likewise contributing to minimizing the production costs as an optional configuration of the external rotor wheel in a weight-saving manner, said external rotor wheel being in particular configured as a worm wheel having a plastics material component or being made from plastics material.

In the case of known external rotor electric motors, the transmission of the torque usually takes place by way of a shaft which is connected to the rotor in a rotationally fixed manner. In contrast, it can be provided in the case of the invention that the rotor per se functions as a housing, that is to say that the drive output takes place directly by way of the rotor of the motor which is configured as the housing.

Replacing the motor housing by the rotor, or the worm wheel, respectively, may furthermore advantageously contribute to minimizing the installation height, because the housing of the motor, which in the case of known devices is always required to encapsulate and/or seal the motor, has its own thickness or height, which contributes to the entire installation height of the device. Manufacturing the external rotor and/or of the worm wheel from plastics material, in particular on contact faces to metallic elements of the drive device, may furthermore contribute toward minimizing noise.

The external rotor of the external rotor electric motor, in particular in a configuration as a worm wheel, may furthermore replace the motor housing. In particular, no additional housing is provided in this case, which receives the motor with the stator and the rotor, or the external rotor, respectively, for sealing said motor against external influences.

In one further configuration, the drive device furthermore comprises a support part having a hub bearing which is configured for rotatably mounting the external rotor wheel, and at least one threaded spindle support which is specified for mounting the thread. The threaded spindle support can furthermore be configured for mounting a part for transmitting the driving torque from the rotor to the thread and/or to the roof component, or to a helix cable for operating the roof component, respectively. Herein, a stator element of the electric motor is disposed around the hub bearing. In particular, the stator element may be configured to be rotationally symmetrical about a central axis of the hub bearing.

It is advantageously achieved as a result that the electric motor is particularly strongly integrated with the drive device.

In one embodiment, the support part is configured so as to be integral with the hub bearing and the at least one threaded spindle support. This advantageously permits a further improved integration and simpler, more cost-efficient and faster manufacturing.

The support element can in particular be formed from plastics material or comprise at least one plastics material component, wherein an injection-molding method can be utilized for manufacturing the support part, for example. In particular, the hub bearing and the threaded spindle support are formed from plastics material.

In particular, no motor housing is provided herein, which encloses the external rotor motor as a separately configured element. Instead, the external rotor wheel may replace such a housing by substantially enclosing the stator element of the electric motor, in particular in combination with the support part.

Furthermore, particularly intensive integration of the electric motor and the support part with the drive device can be achieved. The installation of the drive device can be facilitated, and tolerances during assembly can be improved, because fewer separate parts have to be positioned in relation to one another.

Furthermore, a cover part may be provided which closes off the support part such that in particular only lead throughs and openings required for the operation remain, for instance for helix cables for driving the roof component or for electrical connections.

According to one further advantageous embodiment, the external rotor motor is configured as a brushless electric motor. As a result of the brushless design, a long service life of the motor is guaranteed. Moreover, tiresome high-frequency brush noise is eliminated as a result.

The invention furthermore relates to a roof component for a vehicle, in particular a sliding roof and/or a solar protection roller blind, having the above-explained drive device according to the invention, in particular operatively connected to the drive device for displacing or adjusting the roof component.

The invention furthermore relates to an assembly of the above-explained drive device according to the invention in a vehicle, in particular in a roof region of the vehicle, and in particular for displacing or adjusting a roof component of the vehicle, in particular a sliding roof and/or a solar protection roller blind.

The invention furthermore relates to a vehicle having the above-explained drive device according to the invention, wherein the operatable roof component comprises in particular a sliding roof and/or a solar protection roller blind of the vehicle.

BRIEF DESCRIPTIONS OF THE DRAWINGS

The invention will be explained in more detail hereunder by means of the drawings:

FIG. 6 is explained at the outset in the context of the prior art.

DETAILED DESCRIPTION

A first embodiment of the device according to the invention is shown in FIGS. 1 to 5.

Figure 1:
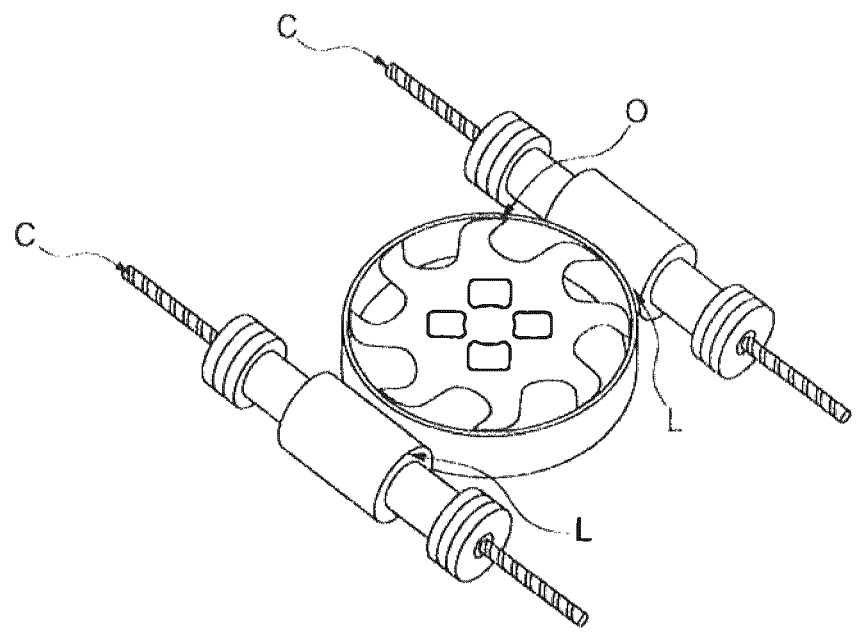
FIG. 1 shows an oblique view of a first embodiment of the drive device according to the invention.

The embodiment of the drive device for the roof components of a vehicle, such as, for instance, a sliding roof and a solar protection roller blind, shown in FIG. 1 comprises an electric motor O which by way of a gearbox 44 drives a helix cable C, which for operating the respective roof component (not illustrated) is fixed to the latter. The electric motor O is an external rotor electric motor of a flat construction mode which is aligned so as to be parallel to the installation height z (see right part of FIG. 5, where z=18 mm) of the drive device in a vehicle roof, the external rotor of said electric motor O meshing with two threaded spindles L, which drive the helix cable C and thus the roof component.

Figure 2:
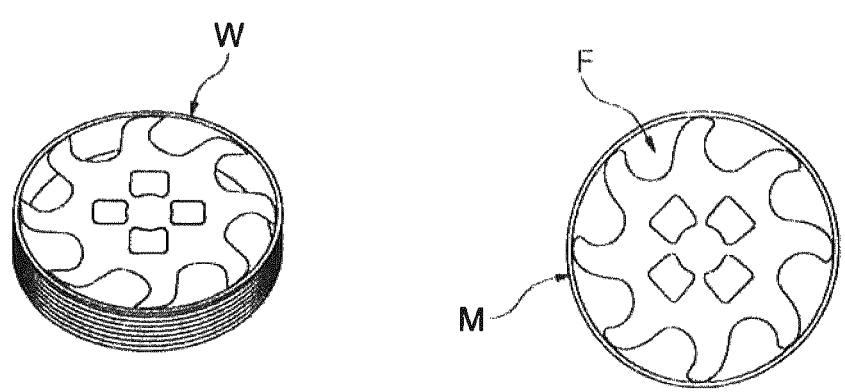
FIG. 2 shows an oblique view and a plan view of the external rotor of the electric motor of the drive device of FIG. 1.

FIG. 2 shows beside one another two views of the external rotor electric motor O of FIG. 1. A worm thread, which is provided on the external side of the wheel-shaped electric rotor of the electric motor and meshes with the two threaded spindles L, is identified by the reference sign W. A magnet assembly, which is provided on the internal side of the wheel-shaped external rotor, is identified by the reference sign M. Openings of a blade wheel cover, which are uniformly spaced apart across the circumference of the external rotor, are identified by the reference sign F, which in the shape of a plate is attached to the upper side of the external rotor. Four further openings, not identified by reference signs, are situated in a cloverleaf arrangement in the center of the blade wheel assembly F.

Figure 3:
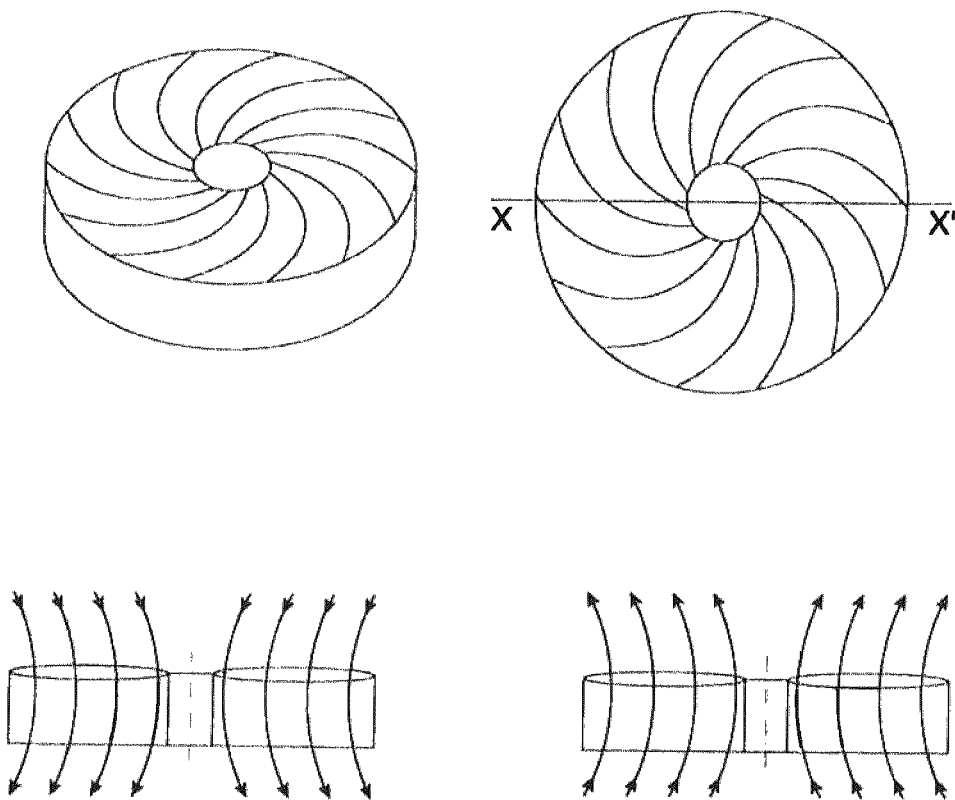
FIG. 3 shows an oblique view and a plan view of the cooling vane structure of the external rotor (upper part of the figure), as well as a cooling flow, which is achievable by this structure and which is perpendicular to the line X-X', at the top right in the illustration of the structure (lower part of the figure)

The blade wheel in the shape of a snail house, shown in FIG. 3 but not visible in FIGS. 1 and 2, for cooling the electric motor O is situated below the plate-shaped blade wheel cover. The flow profile which can be achieved as a result of the rotation of the blade wheel is shown in the lower part of FIG. 3. In particular, an airflow is generated, which is directed differently depending on the direction of rotation, toward the stator of the electric motor disposed therebelow, or away from said stator.

In further exemplary embodiments, no separate blade wheel cover may be provided, but structures in the manner of blade wheels, or other aerodynamic structures for generating an air flow relative to the stator of the motor, may already be configured by the openings F, for example.

Figure 4:
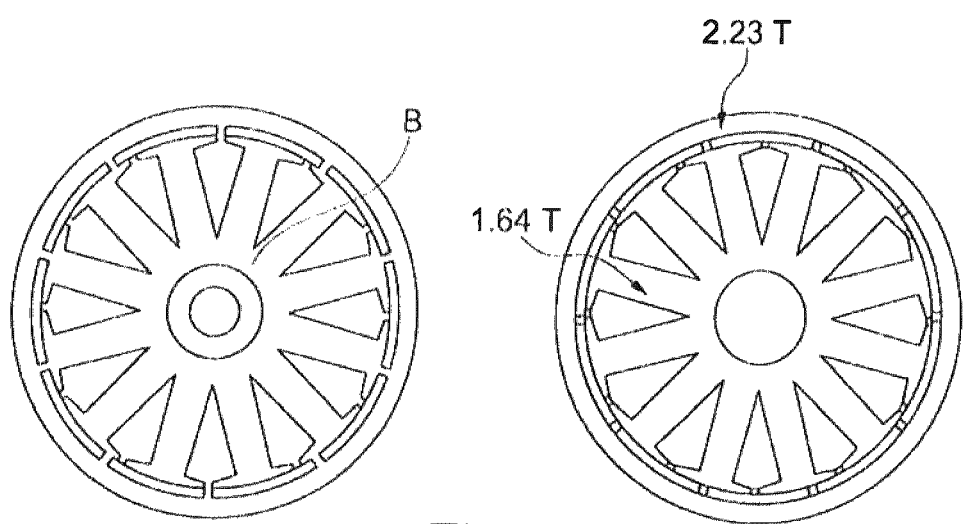
FIG. 4 shows the stator design (left part of the figure) and the achievable magnetic flux density (right part of the figure)

FIG. 4 shows the stator design (left part of the figure) of the exemplary embodiment of the electric motor O, and the achievable magnetic flux density (right part of the figure).

Figure 5:
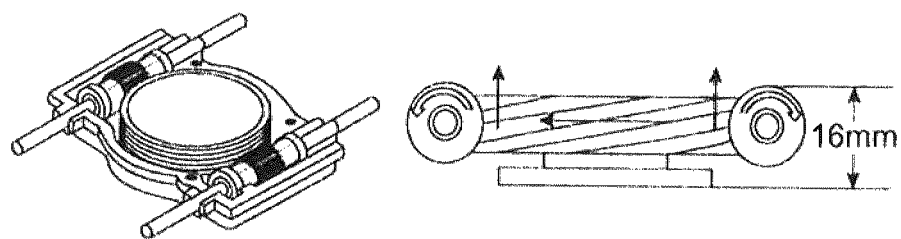
FIG. 5 shows an oblique view (left part of the figure) and an end view of the first exemplary embodiment of the drive device according to the invention of FIG. 1.
Figure 6:
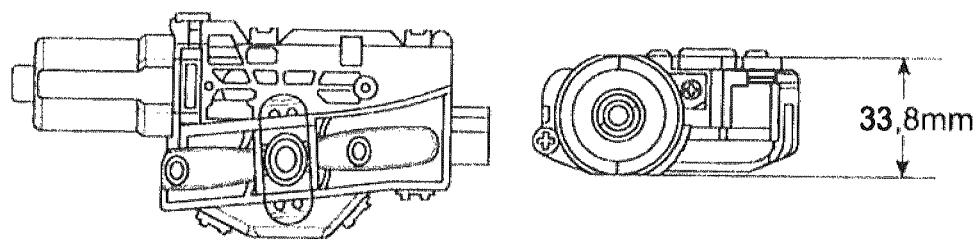
FIG. 6 shows an oblique view (left part of the figure) and an end view (right part of the figure) of a drive device know per se according to the prior art.

FIG. 5 shows an oblique view (left part of the figure) and an end view (right part of the figure) of the drive device of FIG. 1. The end view highlights the extremely flat construction mode of the external rotor electric motor which guarantees the implementation of an installation height of the drive device of only just 16 mm in comparison to the installation height of 33.8 mm of the drive device according to the prior art.

Figure 7:
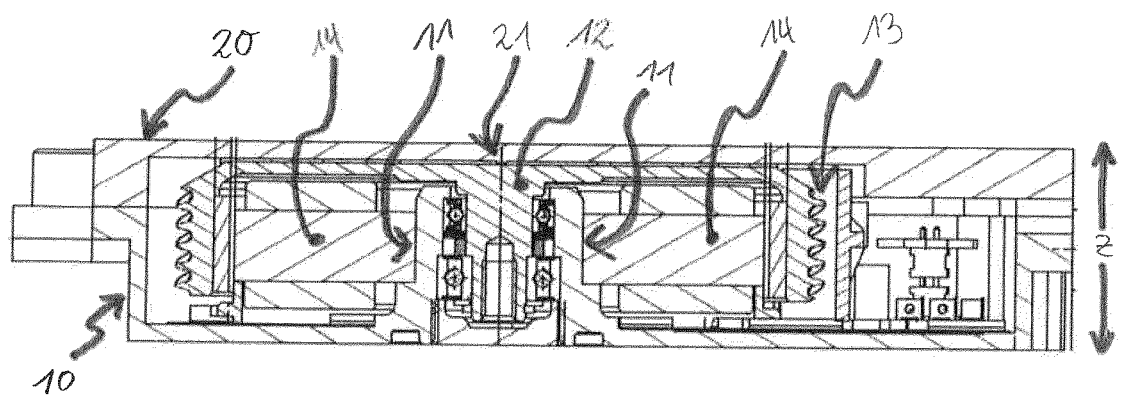
FIG. 7 shows a cross section through a further exemplary embodiment of the drive device.
Figure 8:
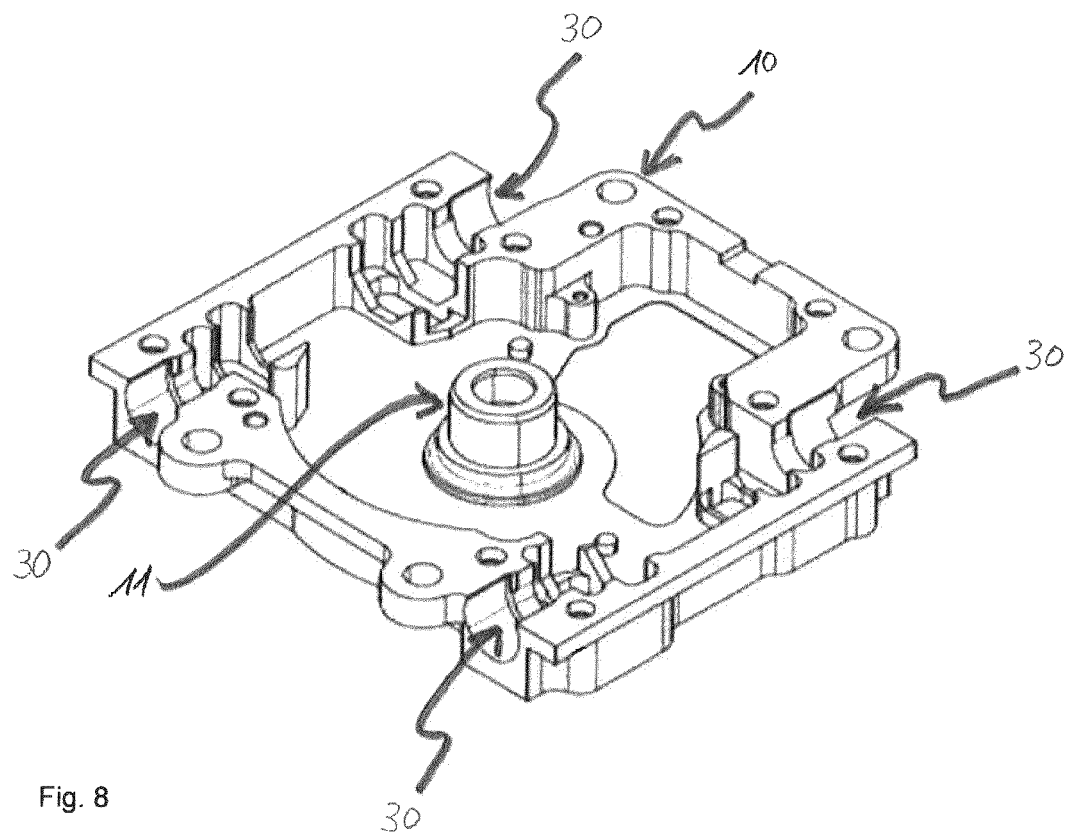
FIG. 8 shows a further detailed view of the further exemplary embodiment of the drive device.

A further exemplary embodiment of the drive device according to the invention will be explained with reference to FIGS. 7 and 8. The explanation here proceeds from the first exemplary embodiment explained with reference to FIGS. 1 to 5; elements of comparable or equivalent configuration will therefore not be explained once again in detail.

In the further exemplary embodiment, the drive device comprises a support part 10 which is in particular configured from plastics material. The support part 10 can in particular be integrally configured and produced, for instance by injection-molding.

The drive device furthermore comprises a cover part 20 which can be connected to the support part 10, for example by screw or bolt connections. The support part 10 and the cover part 20 can furthermore be adhesively bonded or welded to one another. Furthermore, a sealing element, for example a rubber seal, can be disposed between the support element 10 and the cover element 20 so as to prevent the ingress of foreign matter into the interior of the drive device.

Threaded spindle mountings 30 are provided, which are configured in the support part 10 such that threaded spindles L as in FIG. 1 can be mounted therein. The threaded spindles L in this case are mounted so as to be rotatable about the their longitudinal axis and secured against translatory movement such that in each case a helix cable C guided through said threaded spindles L, as a result of a rotation of the threaded spindles L, can be impinged with a force acting in the axial direction and driven. In the exemplary embodiment, the axes of the threaded spindle mountings 30 run such that the helix cables C extend so as to be substantially tangential to a rotor of the drive device and diametrically opposite one another; other arrangements are conceivable in further exemplary embodiments.

A hub bearing 11, in which a hub of a rotor element 12 is rotatably mounted, is furthermore configured in the support part 10. In the assembled state, a cam 21 configured in the cover element 20 secures the hub in relation to a translatory movement in the axial direction. The rotor element 12 is configured as an external rotor 12, or as an external rotor wheel of the motor of the drive device, respectively, said rotor element 12 being configured so as to be pot-shaped and placed over a stator element 14 of the motor lying therebelow; in the exemplary embodiment, the external rotor 12 encloses the stator element 14 of the motor from the upper side and substantially at the sides.

In the exemplary embodiment, the stator element comprises elements for generating alternating magnetic fields, said elements being formed by means of conductor windings. Said alternating magnetic fields alternate with permanent magnets and which are provided on the rotor element 12 and thus lead to the rotor element 12 being driven. In the exemplary embodiment, the stator element 14 is disposed around the hub bearing 11 and is in particular connected to the latter in a rotationally and translationally fixed manner. This means that the hub bearing 11, which is in particular configured so as to be integral with the material of the support element 10, assumes the function of a fastening for the stator element 14 such as would usually be provided in a separate motor housing.

Thus, the external rotor 12 replaces a motor housing, which would normally be provided additionally. When the external rotor 12 rotates in relation to the stator element 14, the drive output, or the transmission to a thread having the threaded spindles S, respectively, takes place directly via the external rotor 12, that is to say via the housing of the motor. A housing, which is normally also provided in the case of external rotor motors and about which a transmission element for driving for instance a thread is disposed, is not provided in the exemplary embodiment. Instead, the support part 10 and the cover part 20 in the assembled state form a housing which protects the electric motor in relation to external influences, said electric motor being mounted directly on the support part 10. By saving a separate housing for the motor, space can be saved within the drive device, in particular in the z-direction, that is to say along the thickness of the assembled drive device, the latter therefore being configured in a particularly flat manner.

In the present exemplary embodiment, the external rotor is formed as a worm wheel which has a toothing 13 which encircles the external circumference and is configured as a worm thread 13. In the exemplary embodiment, the external rotor 12 is formed from metal, and the worm thread 13 is obtained by machining. In further exemplary embodiments, the external rotor 12 can at least in part be formed from plastics material, wherein in particular the toothing 13, or the worm thread 13, respectively, is formed from plastics material.

In a further exemplary embodiment, other types of the toothing 13 are provided alternatively or additionally.

In the assembled state, the threaded spindles L with the helix cables C are disposed relative to the worm wheel 12, essentially as shown in FIG. 1, and mesh with the worm thread 13. From the motor, a drive torque may be transmitted to the threaded spindles L, which then convert said rotation to a translatory movement of the helix cable C, via the rotation of the external rotor 12 by way of the toothing 13.

LIST OF REFERENCE SIGNS

C Helix cable
F Opening
L Threaded spindle
M Magnet assembly
O Electric motor
W Worm thread
z Installation height
10 Support part
11 Hub bearing
12 External rotor; external rotor wheel; rotor element
13 Toothing; worm thread
14 Stator element
20 Cover part
21 Cam
30 Threaded spindle support

The invention claimed is:

1. A drive device configured for a roof component of a vehicle comprising:
   an electric motor which interacts with a gearbox for operating the roof component,
   wherein the electric motor is an external rotor electric motor of a flat construction mode which is aligned so as to be parallel to the installation height of the drive device in a vehicle roof and which has a wheel-shaped external rotor which engages with the gearbox by way of a toothing provided on its external circumference, wherein the rotor comprises a flat support element having an upper side and a further element encircling the support element on which the toothing is formed, wherein the upper side is provided with radially extending cooling vanes, which are set to be transverse, wherein the cooling vanes are inclined and aerodynamically shaped to generate an airflow through the rotor in a direction towards a stator of the motor when the rotor rotates in a first direction, wherein the cooling vanes extend in a radially outer region of the upper side, wherein the cooling vanes are aerodynamically shaped such that air flows through the rotor in a direction away from the stator of the motor when the rotor rotates in a second direction, and wherein the cooling vanes are configured such that an air flow toward the stator of the motor is generated when the rotor rotates in the direction in which the motor is operated at a higher power, and an air flow away from the stator of the motor is generated when the rotor rotates in the direction in which the motor is operated at a lower power.

2. The drive device as claimed in claim 1, wherein the gearbox comprises two threaded spindles which are configured for meshing with the toothing of the electric motor and for driving a helix cable, wherein the helix cable is fixed to the roof component.

3. The drive device as claimed in claim 1, wherein the toothing provided on the external circumference of the external rotor is a worm thread.

4. The drive device as claimed in claim 1, wherein the external rotor electric motor has an installation height of 15 mm to 25 mm.

5. The drive device as claimed in claim 1, wherein the external rotor wheel is a worm wheel.

6. The drive device as claimed in claim 1, wherein the external rotor wheel, which is a worm wheel, comprises a plastics material component or is formed from plastics material.

7. The drive device as claimed in claim 1, furthermore comprising a support part having a hub bearing configured for rotatably mounting the external rotor wheel, and at least one threaded spindle support which is configured for mounting the thread, wherein a stator element of the electric motor is disposed around the hub bearing.

8. The drive device as claimed in claim 7, wherein the support part is configured so as to be integral with the hub bearing and the at least one threaded spindle support.

9. The drive device as claimed in claim 1, wherein the external rotor motor is a brushless electric motor.

10. The drive device as claimed in claim 1, wherein the external rotor electric motor has an installation height of 16 mm to 18 mm.

11. The drive device as claimed in claim 1, wherein the roof component is a sliding roof or a solar protection roller blind.

* * * * *